United States Patent [19]

Hjelm et al.

[11] 3,941,364

[45] Mar. 2, 1976

[54] ADJUSTABLE SHAFT REST ASSEMBLY

[75] Inventors: Victor S. Hjelm, Stratford; John H. Rohles, Orange, both of Conn.

[73] Assignee: Eldorado Tool and Manufacturing Corporation, Milford, Conn.

[22] Filed: June 5, 1974

[21] Appl. No.: 476,425

[52] U.S. Cl. ................ 269/156; 269/203; 269/243; 269/296

[51] Int. Cl.[2] ........................ B23Q 3/06; B25B 5/10

[58] Field of Search............ 269/156, 165, 126–129, 269/296, 309, 310, 243, 244, 228; 279/66, 110, 83, 112, 123

[56] References Cited

UNITED STATES PATENTS

| | | | |
|---|---|---|---|
| 928,657 | 7/1909 | Howell | 269/203 X |
| 1,413,229 | 4/1922 | Kopf | 254/103 |
| 2,604,804 | 7/1952 | Schultz | 269/128 X |
| 2,908,403 | 10/1959 | Browder, Jr. et al. | 269/17 |
| 3,035,831 | 5/1962 | Blatt | 269/228 |
| 3,521,875 | 7/1970 | Kapelsohn | 269/287 |
| 3,559,980 | 2/1971 | Terai | 269/296 X |
| 3,851,869 | 12/1974 | Damewood | 269/127 |

*Primary Examiner*—Roy Lake
*Assistant Examiner*—Neil Abrams
*Attorney, Agent, or Firm*—Spencer T. Smith

[57] ABSTRACT

An adjustable shaft rest assembly is disclosed for securely clamping a workpiece to a fixture table. A clamp including a clamp head which is selectively displaceable from a first position to a second position is mounted on a base and a pair of bores are defined in the base with the axes thereof intersecting the axis of a clamped workpiece for receiving a pair of shaft rests which can be selectively axially displaced from first positions to second positions. Each of the first and second shaft rests includes a threaded central bore which is threadedly received by first and second threaded studs which are fixedly secured within the base bores.

9 Claims, 1 Drawing Figure

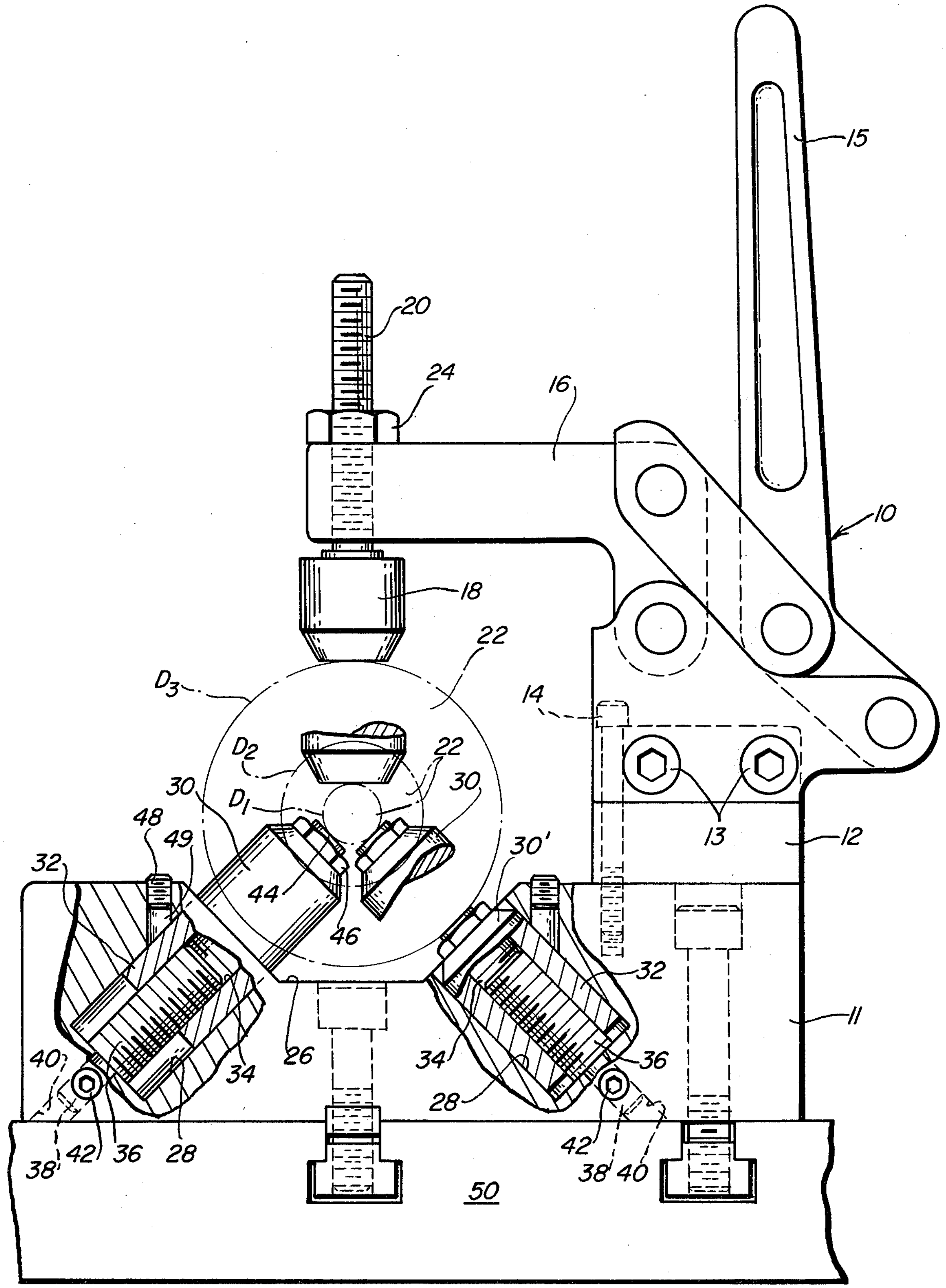
15
10
20
24
16
18
22
D3
14
D2
22
D1
30
30
13
12
48
49
30'
32
44
46
32
11
40
34
26
34
36
28
42
36
28
42
38'
38
40
50

ADJUSTABLE SHAFT REST ASSEMBLY

The present invention relates to shaft rest assemblies for clamping workpieces to fixture tables or the like.

In drilling, such as where a hole is to be precisely drilled into a stationary workpiece, the fixturing must be aligned as accurately as the machine. Conventionally, the workpiece is clamped between a V block and a toggle clamp and fine adjustments in the location of the axis of the workpiece are effected after the workpiece has been unclamped by either filing down a supporting surface of the V block or elevating the V-block with suitable shims or the like.

It is an object of the present invention to provide a shaft rest assembly which can readily and repeatedly effect fine adjustments in the location of the axis of a workpiece to be clamped in the assembly.

Other objects and advantages of the present invention will become apparent from the following portion of this specification and from the accompanying drawing which illustrates, in accordance with the mandate of the patent statutes, a presently preferred embodiment incorporating the teachings of the invention.

Referring to the drawing:

The sole FIGURE comprises an elevational view of a shaft rest assembly made in accordance with the teachings of the present invention.

The adjustable shaft rest assembly includes a toggle clamp 10, which is mounted on a shaft rest base 11. The toggle clamp is secured to a mounting bracket 12 by screws 13 or the like is maintained in the desired position by screws 14 which extend through the mounting bracket 12 into the shaft rest base. When the clamp handle 15 of the toggle clamp is displaced from the unclamped position to the illustrated clamped position, the clamp arm 16 to which the clamp head 18, having a planar work engaging surface is secured, is advanced from a retracted position to the illustrated clamping position. The clamp head is mounted on the clamp arm via a clamp stud 20 which is threadedly received in a suitable clamp arm bore and which is selectively adjustable from a first axial position (fully illustrated) to a second axial positon (partially illustrated) for clamping cylindrical shafts 22, which may have a diameter ranging from a minimum diameter $D_1$ to maximum diameter $D_3$. The lengths of the stud 20 and the height of the toggle clamp mounting bracket 12 are selectively chosen to permit the desired displacement of the clamp head. The precise position of the clamp can be maintained by a suitable jam nut 24 or the like.

The top surface of the shaft rest base 11 includes a channel 26, which is configured to permit proper concentric clamping of shafts having diameters within the predetermined range and a pair of bores 28 are defined in the shaft rest base with the axes thereof substantially intersecting the desired center of a shaft to be clamped. The axis of each bore establishes an angle with the other bore as well as with the axis of the clamp head 18.

A shaft rest 30 is inserted into each bore and includes an outer casing 32 having a threaded central bore 34 for threadly receiving a stud 36. The stud includes an end portion 38 which is suitably received in a second coaxial bore 40 and which is locked in position by a set screw and shoe 42. A button 44 having a workpiece engaging surface is fixedly secured to the outer casing 32 whereby rotation of the shaft rest integral hexagon surface 46 will advance or retract the shaft rest, and hence, button 44. Once the shaft rest has been located at a desired axial position, further axial displacement can be prevented by advancing a set screw 48, (and shoe 49) into locking engagement with the outer casing 32 of the shaft rest.

It can be appreciated that with the disclosed shaft rest assembly, the center of a supported shaft can be displaced solely in the vertical direction by changing the axial position of each of the shaft rests 30 by an identical amount or the center of a supported shaft can be shifted any selected distance in any compound direction (displacement in X + Y directions) by incrementally, individually adjusting the shaft rests 30 by different axial amounts until the actual and desired axes coincide.

All adjustments are reversible in character, and accordingly, the disclosed shaft rest assembly can be reused time and time again to properly clamp workpieces having a diameter within the predetermined range of the shaft rest assembly.

In the preferred embodiment, two sets of shaft rests are provided. One set 30 is axially adjustable from the maximum diameter $D_3$ to an intermediate diameter $D_2$, and the second set 30' is axially adjustable from the intermediate diameter $D_2$ to the minimum diameter $D_1$.

The adjustable shaft rest assembly may be fixedly mounted on a fixture table 50 or the like in any conventional manner, and has particular application to the field of gundrilling wherein one end of a workpiece is suitably located in a chuck assembly and the free end of the workpiece, as well as several intermediate workpiece locations, must be supported with the actual axis of the workpiece precisely coinciding with the desired axis thereof.

The adjustable shaft rest assembly can also be utilized to properly align workpieces on milling and drilling machine tables, or for inspection or layout on surface plates, or for brazing or welding operations. Additionally, the adjustable shaft rest assembly can be utilized to align workpieces in assembly operations; or wherever similar alignment characteristics exist.

What is claimed is:

1. An adjustable shaft rest assembly for securely clamping a workpiece to a fixture table or the like comprising a base, a clamp mounted on said base and including a clamp head selectively axially advanceable from a first position to a second position, a first pair of bores defined in said base with the axes thereof being angularly related and intersecting the axis of a clamped workpiece, said bores including first and second coaxial portions, first and second threaded studs including a first threaded portion and a second portion selectively configured for insertion into said second base bore portions, first and second shaft rests, said shaft rests being selectively configured for insertion into said first portion of said first pair of base bores and including threaded central bores for threadedly receiving said first threaded portion of said first and second threaded studs, said base including a threaded bore angularly intersecting said second portion of each of said first pair of base bores and a pair of set screw means for selected advancement into said pair of threaded base bores for fixedly locating said threaded studs.

2. An adjustable shaft rest assembly according to claim 1, wherein each of said set screw means comprises a set screw and a shoe adapted to be located within one of said threaded base bores intermediate one of said threaded studs and said set screw.

3. An adjustable shaft rest assembly according to claim 1, further comprising means for selectively preventing the rotation of each of said shaft rests.

4. An adjustable shaft rest assembly according to claim 1, wherein said clamp is a toggle clamp.

5. An adjustable shaft rest assembly according to claim 1, wherein each of said shaft rests further includes a hexagonal surface at the exposed end thereof.

6. An adjustable shaft rest assembly according to claim 1, wherein the axes of said first pair of base bores and the axis of said clamp head intersect the axis of a clamped workpiece and lie in a single plane.

7. An adjustable shaft rest assembly according to claim 1, further comprising a second pair of threaded bores angularly intersecting said first portion of each of said first pair of base bores and a second pair of set screw means for selective advancement into said second pair of threaded bores for forcefully engaging and preventing the rotation of said shaft rests.

8. An adjustable shaft rest assembly according to claim 7, wherein each of said second pair of set screw means comprises a set screw and a shoe adapted to be located within one of said second pair of threaded bores intermediate one of said shaft rests and said set screw.

9. An adjustable shaft rest assembly according to claim 8, wherein said clamp is a toggle clamp.

* * * * *